United States Patent
Taneya et al.

(10) Patent No.: US 7,848,783 B2
(45) Date of Patent: Dec. 7, 2010

(54) MOBILE COMMUNICATION DEVICE AND SCREEN SWITCHING METHOD FOR MOBILE COMMUNICATION DEVICE

(75) Inventors: Yuichi Taneya, Osaka (JP); Kazuo Nakamoto, Higashiosaka (JP); Kohei Tokuyama, Amagasaki (JP); Yoshiyuki Nakano, Ikeda (JP)

(73) Assignee: Kyocera Corporation, Kyoto (JP)

( * ) Notice: Subject to any disclaimer, the term of this patent is extended or adjusted under 35 U.S.C. 154(b) by 224 days.

(21) Appl. No.: 10/578,676

(22) PCT Filed: Nov. 26, 2004

(86) PCT No.: PCT/JP2004/017545

§ 371 (c)(1),
(2), (4) Date: May 9, 2006

(87) PCT Pub. No.: WO2005/053281

PCT Pub. Date: Jun. 9, 2005

(65) Prior Publication Data

US 2007/0081638 A1 Apr. 12, 2007

(30) Foreign Application Priority Data

Nov. 26, 2003 (JP) .............................. 2003-396303

(51) Int. Cl.
*H04B 1/38* (2006.01)
(52) U.S. Cl. .................................... 455/566; 348/14.07

(58) Field of Classification Search ................. 455/566, 455/575.3
See application file for complete search history.

(56) References Cited

U.S. PATENT DOCUMENTS

| | | | |
|---|---|---|---|
| 5,947,619 A * | 9/1999 | Kurashina et al. ......... 400/615.2 |
| 6,697,083 B1 | 2/2004 | Yoon ........................... 345/658 |
| 6,807,275 B1 | 10/2004 | Kubo et al. |
| 6,839,068 B2 | 1/2005 | Yoshioka |
| 2003/0090497 A1 | 5/2003 | Yoshioka |
| 2004/0023685 A1* | 2/2004 | Nakamura ............... 455/550.1 |
| 2004/0058715 A1* | 3/2004 | Taniguchi et al. ........... 455/566 |
| 2004/0116167 A1* | 6/2004 | Okuzako et al. ......... 455/575.3 |

FOREIGN PATENT DOCUMENTS

| | | |
|---|---|---|
| JP | 10-13288 | 1/1998 |
| JP | 2001-136248 | 5/2001 |
| JP | 2002-182638 | 6/2002 |
| JP | 2003-122339 | 4/2003 |
| JP | 2003-150145 | 5/2003 |
| JP | 2003-198676 | 7/2003 |
| JP | 2003-298703 | 10/2003 |

* cited by examiner

*Primary Examiner*—Rafael Pérez-Gutiérrez
*Assistant Examiner*—Marcos Batista
(74) *Attorney, Agent, or Firm*—Morrison & Foerster LLP

(57) ABSTRACT

Web page content, which is the same as web page content displayed on a first display unit with a mobile communication device in an opened state, is displayed on a smaller-sized second display unit with the mobile communication device in a closed state, without reacquiring content by another communication.

11 Claims, 6 Drawing Sheets

CLOSED STATE

OPENED STATE

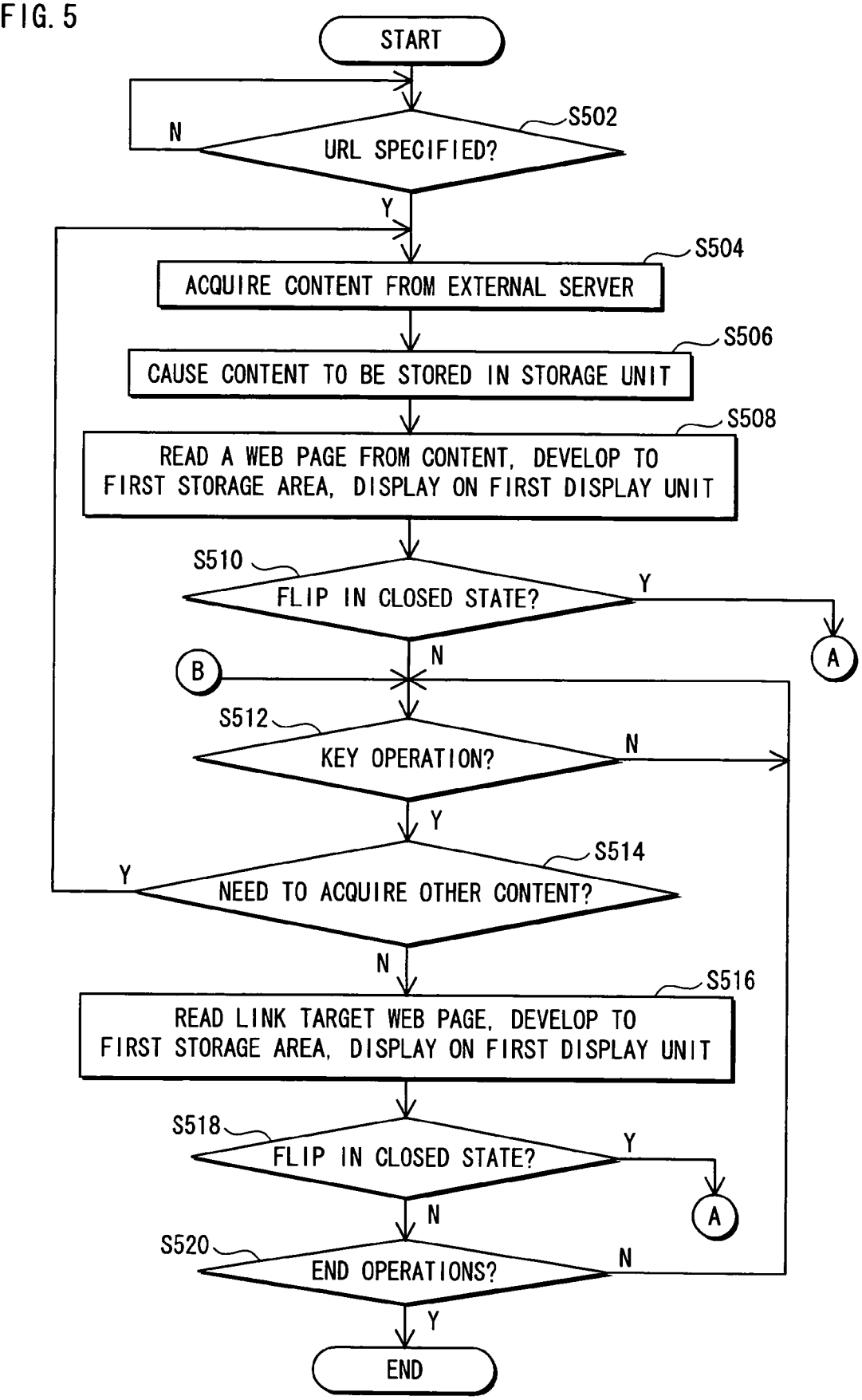

MOBILE COMMUNICATION DEVICE AND SCREEN SWITCHING METHOD FOR MOBILE COMMUNICATION DEVICE

TECHNICAL FIELD

The present invention relates to a mobile communication device, and in particular to screen switching technology for two screens that differ in size.

BACKGROUND ART

There have been remarkable developments in mobile phones, which are mobile communication devices, including the ability to access websites and display web pages on the main screen, in addition to calling functions. Also, mobile phones have become predominantly folding-type. Folding-type mobile phones are provided with not only a main screen, but also a sub screen on the surface of the flip in a closed state.

However, the main screen is, for example, 240×320 dot in size, while the sub screen is only 120×160 dot in size.

It is for this reason that accessing websites and displaying web pages is conventionally limited to the main screen. Supposing that a retrieved web page were to be displayed on the sub screen, the size of characters displayed on the main screen would need to be reduced for display on the sub screen. In this case, it would be necessary to access the website again, reacquire the web page, and display the characters at a reduced size on the sub screen. The reason for this is that browsers can only perform a display according to the size of the display screen.

Note that display control of main screens and sub screens is disclosed in, for example, patent documents 1 and 2.

Patent document 1: Japanese Laid-Open Patent Publication No. H10-13288 (1998)

Patent document 2: Japanese Laid-Open Patent Publication No. 2003-298703

DISCLOSURE OF THE INVENTION

Problems Solved by the Invention

However, displaying the same web page on the main screen and the sub screen conventionally requires communication with the website since content must be reacquired if the main screen and sub screen have different screen sizes (i.e., resolutions).

In view of the above issue, an object of the present invention is to provide a mobile communication device that can display a desired web page on both the main screen and the sub screen without reacquiring content.

Means to Solve the Problems

The above object is achieved by an openable/closable mobile communication device having a first display screen and a second display screen that differ in screen size, and including a storage unit operable to store data; and a display control unit operable to read the data stored in the storage unit and display the data on the first display screen with a device main body in an opened state, and read the same data and display the data on the second display screen with the device main body in a closed state.

Effects of the Invention

According to the above structure, the same data that is displayed on the first display screen, which is the main screen, can be displayed on the second display screen, which is the sub screen, depending on whether the mobile communication device is in the opened state or the closed state. Consequently, data information displayed on the first display screen can be displayed on the second display screen without reacquisition by communicating again. As a result, the present invention can save needless communication fees.

Also, a screen size of the second display screen may be smaller than a screen size of the first display screen.

According to this structure, the same data on the first display screen can be displayed in reduced size on the second display screen, which is the sub screen.

Also, the mobile communication device may further include a detection unit operable to detect whether the device main body is in the opened state or the closed state. Here, the display control unit may include a first storage subunit that corresponds to the screen size of the first display screen, and a second storage subunit that corresponds to the screen size of the second display screen; when a notification of the opened state is received from the detection unit, the display control unit may read, from the storage unit, a desired web page which is the data, develop the web page to the first storage subunit as bitmap data, and display the bitmap data on the first display screen; and when a notification of the closed state is received from the detection unit, the display control unit may read the desired web page from the storage unit, develop the web page to the second storage subunit as bitmap data, and display the bitmap data on the second display screen.

According to this structure, a web page from acquired data can be displayed on the first display screen or second display screen depending on whether the mobile communication device is in the opened state or the closed state, and a desired web page can be displayed on the second display screen with the mobile communication device in the closed state.

Also, the display control unit may set a size of a character that is to be developed to the first storage subunit as bitmap data to a size specified by display information of the data stored in the storage unit, and change a size of a character that is to be developed to the second storage subunit as bitmap data to a minimum size specified by the display information.

According to this structure, characters can be displayed on the smaller-sized second display screen in a size that is smaller than on the first display screen.

Also, the size specified by the display information may be one of 36×36 dot, 26×26 dot, 18×18 dot, and 12×12 dot; and the minimum size may be 12×12 dot.

According to this structure, 12×12 dot characters are displayed on the second display screen.

Also, when a size of an image to be developed to the second storage subunit as bitmap data is larger than a size of the second storage subunit, the display control unit may reduce the image to a size that can be held in the second storage subunit.

According to this structure, the same content as on the first display screen can be displayed on the smaller-sized second display screen as well.

Also, the data stored in the storage unit may be web page content of a website, the content being acquired via a public network.

According to this structure, a desired web page can be displayed on either the first or second display screen by acquiring content with only one instance of access to an external website, thereby avoiding needless communication fees.

Also, a five-point contact key for specifying a link in data displayed on the second display screen may be provided on a same surface as the second display screen.

According to this structure, "net surfing" can be enjoyed on the second display screen with the mobile communication device in a closed state.

Also, a screen switching method for an openable/closable mobile communication device having a first display screen and a second display screen that differ in screen size includes a recording step of recording data; and a display control step of reading the data recorded in the recording step and displaying the data on the first display screen with a device main body in an opened state, and reading the same data and displaying the data on the second display screen with the device main body in a closed state.

According to this method, the same data displayed on the first display screen, which is the main screen, can be displayed on the second display screen, which is the sub screen, without additional communication.

BRIEF DESCRIPTION OF THE DRAWINGS

FIG. 5 is part 1 of a flowchart describing operations of embodiment 1; and

Figure 1:
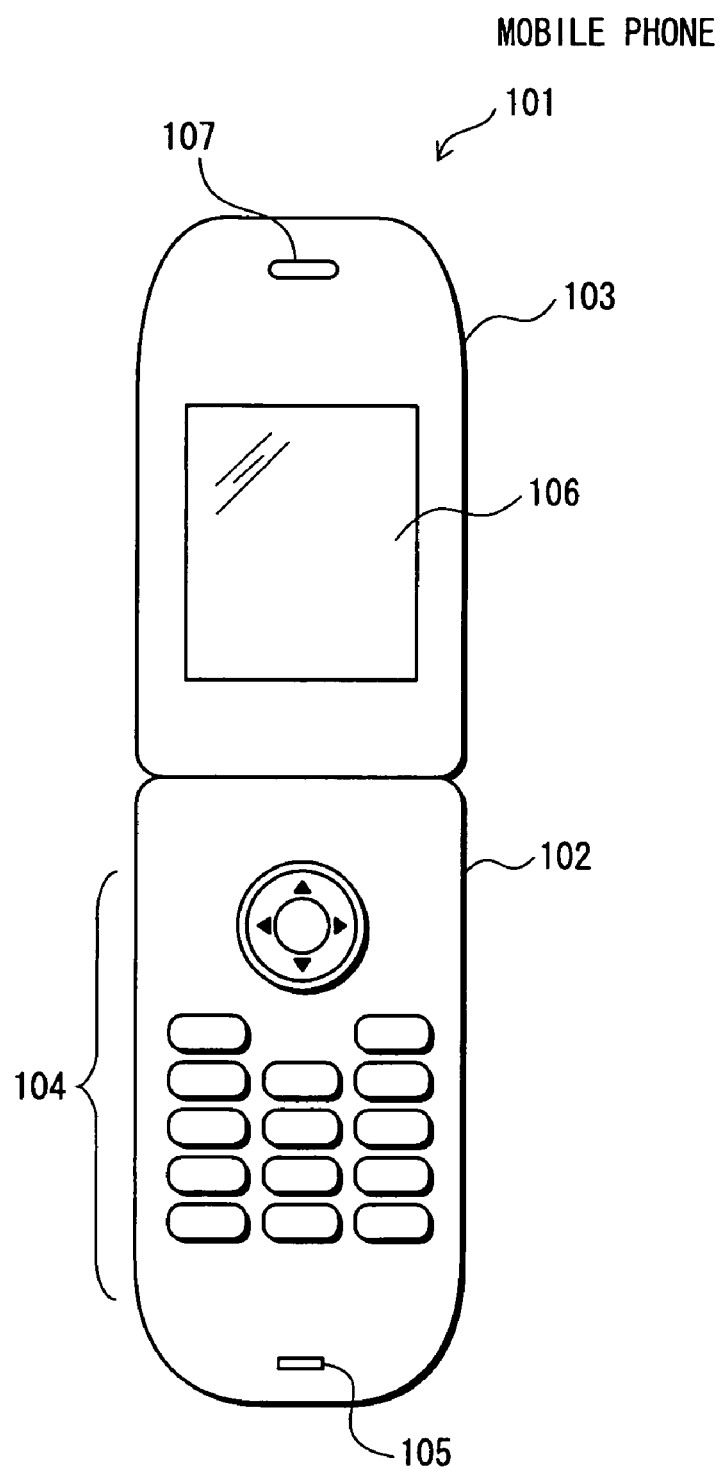
FIG. 1 is a front view illustrating embodiment 1 of a mobile phone pertaining to the present invention, in an opened state.

DESCRIPTION OF THE CHARACTERS 101 mobile phone
102 main body
103 flip
104 operation key cluster
105 microphone
106 first display unit
107 speaker
201 second display unit
202 operation key
203 antenna
204 main body lateral surface
205 side key
301 duplexer
302 reception unit
303 transmission unit
304 control unit
305 storage unit
306 operation unit
307 opened/closed detection unit
308 display control unit

BEST MODE FOR CARRYING OUT THE INVENTION

An embodiment of a mobile phone, which is a mobile communication device pertaining to the present invention, is described below with reference to the drawings.

Embodiment 1

FIG. 1 is a front view illustrating embodiment 1 of a mobile phone pertaining to the present invention, in an opened state.

A mobile phone 101 is composed of a main body 102 and a flip 103 that is foldable with respect to the main body 102. The main body 102 is provided with an operation key cluster 104 and a microphone 105. The flip 103 is provided with a first display unit 106 and a speaker 107.

A second display unit, which has a screen size smaller than the first display unit 106, is provided on a back face of the flip 103.

Figure 2:
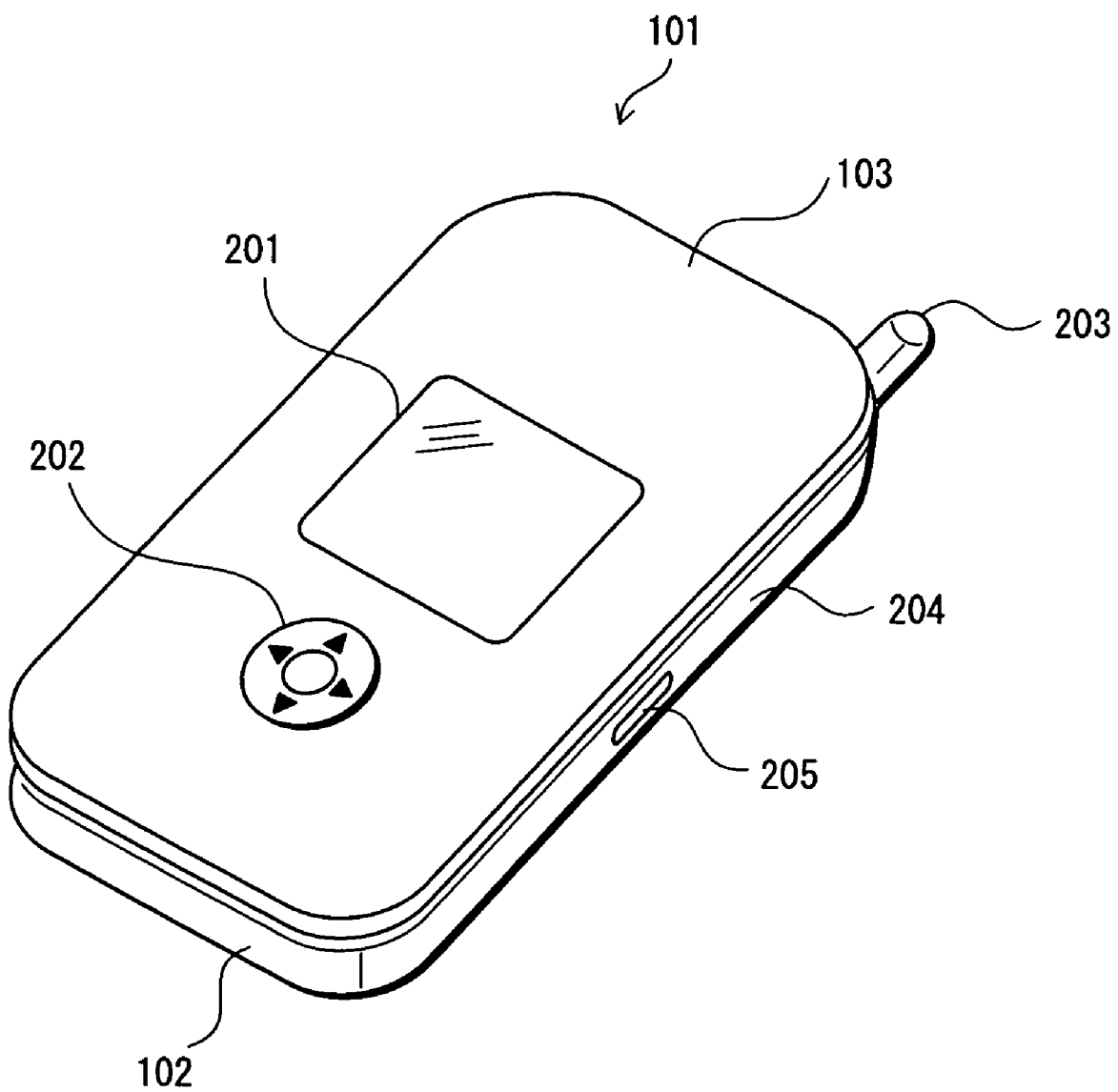
FIG. 2 is an inclined view illustrating a closed state of the mobile phone according to embodiment 1.

FIG. 2 is an inclined view illustrating a closed state of the mobile phone with the flip 103 folded.

The flip 103 is provided with the second display unit 201 and an operation key 202. An antenna 203 is retractably provided in an upper portion of the main body 102. Also, a side key 205 is provided on a main body lateral surface 204.

Figure 3:
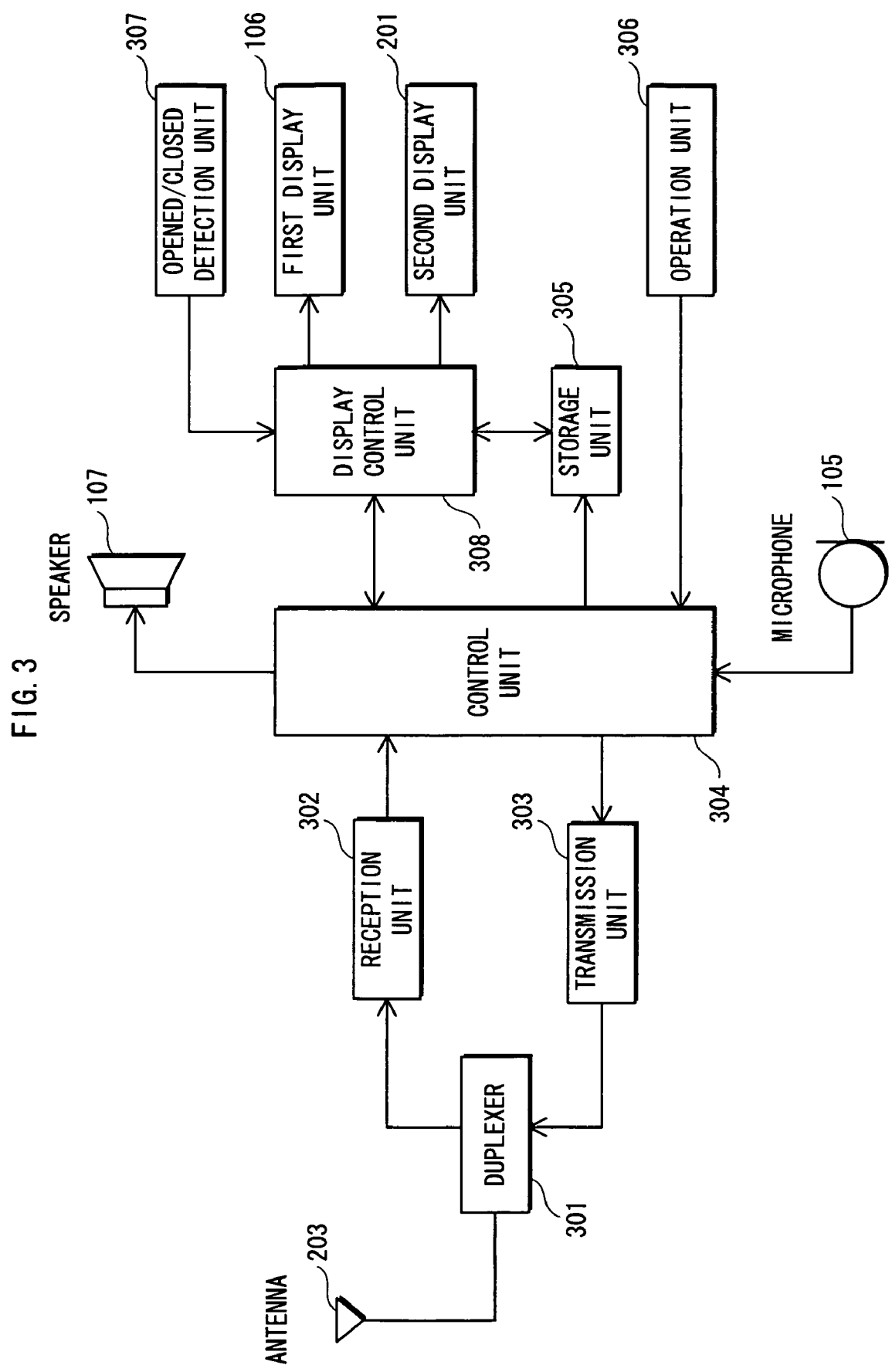
FIG. 3 is a block diagram of embodiment 1.

FIG. 3 is a block diagram of this mobile phone.

The mobile phone 101 includes the antenna 203, a duplexer 301, a reception unit 302, a transmission unit 303, a control unit 304, the microphone 105, the speaker 107, a storage unit 305, an operation unit 306, an opened/closed detection unit 307, the first display unit 106, the second display unit 201 and a display control unit 308.

The antenna 203 performs communication with a base station (not depicted). Signals received by the antenna 203 are output to the duplexer 301. Signals input from the duplexer 301 are transmitted to the base station.

The duplexer 301 outputs signals received by the antenna to the reception unit 302, and outputs signals input from the transmission unit 303 to the antenna 203.

The reception unit 302 demodulates signals input from the duplexer 301, and notifies the demodulated signals to the control unit 304.

The transmission unit 303 modulates signals notified from the control unit 304, and outputs the modulated signals to the duplexer 301. If a notification from the control unit 304 is an instruction to access a web server, the transmission unit 303 accesses the instructed web site and requests transmission of content.

The control unit 304 interprets signals notified from the reception unit 302, outputs audio signals to the speaker 107, and causes content acquired from the external server to be stored in the storage unit 305. The control unit 304 processes audio that is input from the microphone 105, converts the audio into audio signals, and outputs the audio signals to the transmission unit 303.

Also, the control unit 304 interprets operation signals from operation keys, which are notified from the operation unit 306, and outputs data signals to the transmission unit 303.

Upon receiving a notification of selection from the operation unit 306, the control unit 304 notifies the selection to the display control unit 308. Upon receiving a notification of link information from the display control unit 308, the control unit 304 instructs the transmission unit 303 to access an external web server indicated by the link information.

Note that the control unit 304 controls units of the mobile phone 101.

The microphone 105 collects audio from a user's call, and outputs the audio to the control unit 304.

The speaker 107 outputs audio regarding call content received from the party who the mobile phone 101 is calling. Also, the speaker 107 outputs audio generated by the control unit 304 and the like.

The storage unit 305 is constituted from RAM and the like, and stores content acquired from a web server. This content includes image data and HTML documents that describe website pages. Note that the image data may be stored as a file attachment.

The operation unit 306 is constituted from the operation key cluster 104, the operation key 202 and the side key 205, and receives user instructions as operations of the operation keys. The operation unit 306 notifies operation signals to the control unit 304.

Also, on receipt of a user's selection from content displayed on the first display unit 106 or the second display unit 201, the operation control unit 306 notifies the selection to the control unit 304.

Note that selection from items on the second display unit 201 is carried out using the operation key 202, which is a five-point contact key.

The opened/closed detection unit 307 detects whether the mobile phone 101 is in a closed state (depicted in FIG. 2) in which the flip 103 is closed, or in an opened state in which the flip 103 is opened, and notifies the detected state to the display control unit 308. Note that the opened state includes not only the fully unfolded state of the flip 103 as shown in FIG. 1, but also intermediately folded states (states other than as shown in FIG. 2).

The display control unit 308 has a first storage area corresponding to the size of the first display unit 106, and a second storage area corresponding to the size of the second display unit 201. When displaying, on the first display unit 106 or the second display unit 201, a web page from content stored in the storage unit 305, the display control unit 308 reads the web page content, and develops the web page to these areas as bitmap data.

Upon receiving a notification of selection from the operation unit 306 via the control unit 304, the display control unit 308 judges whether the selected link on the displayed web page, which is stored in the storage unit 305, points to external content or content that includes the displayed web page. If the selected link points to content that includes the displayed web page, the display control unit 308 reads the link target web page from the storage unit 305. If notified by the opened/closed detection unit 307 that the mobile phone is in the opened state, the display control unit 308 develops the read web page to the first storage area as bitmap data, and displays the bitmap data on the first display unit 106.

If notified by the opened/closed detection unit 307 that the mobile phone is in the closed state, the display control unit 308 changes characters included in the web page to a minimum character size such as 12×12 dot, develops the web page to the second storage area as bitmap data, and displays the bitmap data on the second display unit 201.

Note that the sizes of characters included in the read web page are indicated as content display information, depending on the size of the display screen, and are relative. The relative character sizes are defined as maximum, big, small and minimum, which may be, for example, 36×36 dot, 26×26 dot, 18×18 dot and 12×12 dot respectively. Displays on the first display unit 106 are developed to the first storage area as bitmap data, in accordance with this display information.

If the link target is judged to be content not stored in the storage unit 305, the display control unit 308 notifies link information to the control unit 304. This link information includes a URL of the link target content.

Also, if the web page that was read includes an image, the image is developed by the display control unit 308 at its original size when being developed to the first storage area as bitmap data. When developing the image to the second area as bitmap data, the display control unit 308 reduces the image, if it is larger than the second storage area, so as to fit in the second storage area, and develops the image as bitmap data.

Note that if the display control unit 308 receives a notification of the closed state from the opened/closed detection unit 307, and a web page from the content is being displayed on the first display unit 106, the display control unit 308 erases the display of the first display unit 106, reads the same web page from the storage unit 305, develops the web page to the second storage area as bitmap data, and displays the bitmap data on the second display unit 201.

Similarly, if the display control unit 308 receives a notification of the opened state from the opened/closed detection unit 307 while displaying a content page on the second display unit 201, the display control unit 308 erases the display of the second display unit 201, reads the same web page from the storage unit 305, develops the web page to the first storage area as bitmap data, and displays the bitmap data on the first display unit 106.

The first display unit 106 is composed of an LCD which forms the main screen. The screen is, for example, 240×320 dot in size. The first display unit 106 displays web pages included in content acquired from a website, under the control of the display control unit 308.

Note that telephone numbers and the like which have been input using the operation unit 306 are displayed when using the calling function that is the original function of the mobile phone 101, but a description of this display is omitted since it is outside the principal subject matter of the present invention.

The second display unit 201 is composed of an LCD which forms the sub screen. The resolution of the second display unit is lower than that of the first display unit, and the screen is, for example, 120×160 dot in size. The second display unit 201 displays web pages from content stored in the storage unit 305, under control of the display control unit 308.

Figure 4A:
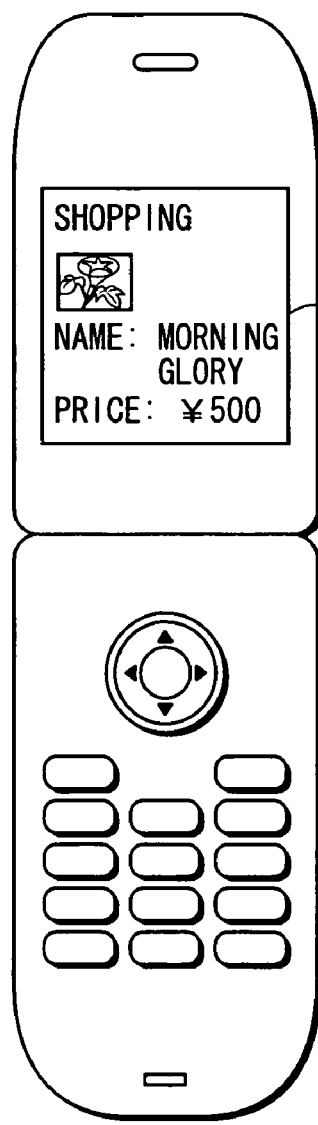
FIG. 4A shows a web page displayed on a first display unit of embodiment 1 in the opened state.
Figure 4B:
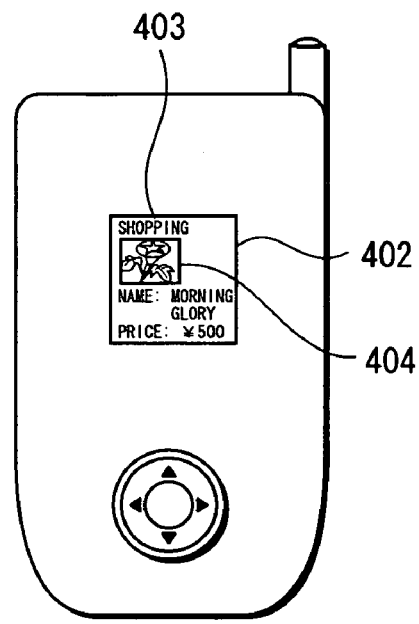
FIG. 4B shows the same web page as in FIG. 4A, displayed on a second display unit of embodiment 1 in the closed state.

FIGS. 4A and 4B show the same web page being displayed on each of the first display unit 106 and the second display unit 201.

A "SHOPPING" web page is displayed on a screen 401 of the first display unit 106 in accordance with display information of the content.

The same web page is displayed on a screen 402 of the second display unit 201 with a reduced character size. Characters 403 of "SHOPPING" have been changed to the minimum size. Note that an image 404 of a morning glory on the screen 402 is displayed at the same size as the same image on the screen 401, since the image 404 can fit on the screen 402.

If the image 404 were larger than the screen 402, the display control unit 308 would reduce the size of the image 404 to fit the screen 402, develop the image 404 to the second storage area as bitmap data, and display the bitmap data on the second display unit 201.

Figure 6:
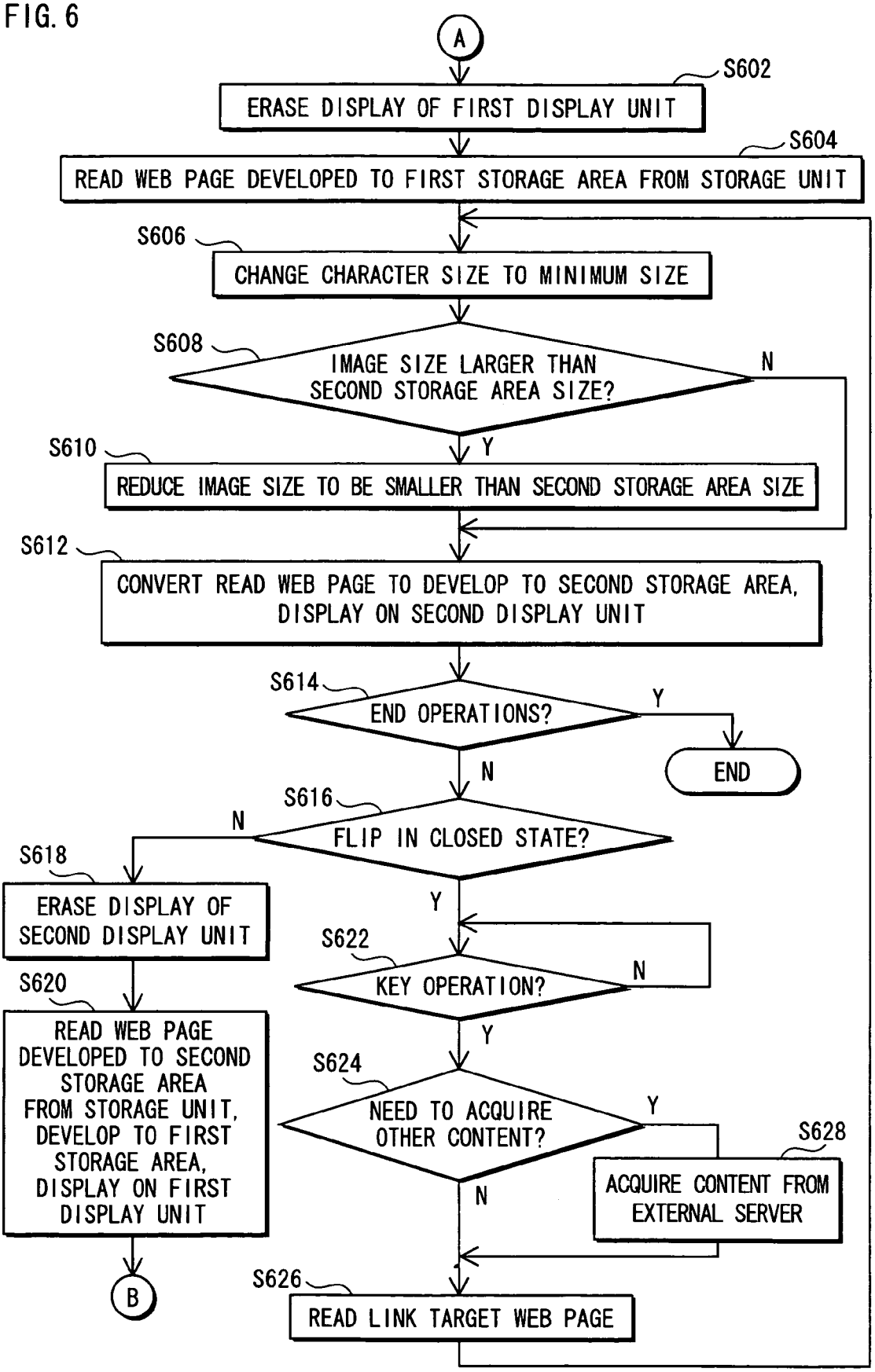
FIG. 6 is part 2 of the flowchart describing operations of embodiment 1.

The following describes operations of the present embodiment using the flowcharts in FIGS. 5 and 6.

The display control unit 308 waits for a user operation of an operation key, which is notified from the operation unit 306 via the control unit 304, to be a designation of a URL that is linked to a menu item (S502), and then accesses an external website via the control unit 304 and the like. The control unit 304 acquires content from an external server via the reception unit 302 and the like (S504). The acquired content is stored in the storage unit 305 (S506).

The display control unit 308 reads a desired web page from content stored in the storage unit 305, develops the web page to the first storage area as bitmap data, and displays the bitmap data on the first display unit 106 (S508).

The display control unit 308 judges whether there is a notification of the closed state in which the flip 103 is folded from the opened/closed detection unit 307 (S510), and processing moves to S602 if the judgment is in the affirmative.

If the mobile phone is in the opened state, the display control unit 308 waits for a user key operation from the operation unit 306, and determines whether the link target of the selected item is content not stored in the storage unit 305 (S514), whereafter processing moves to S504 if the selected item is content not stored in the storage unit 305. If the link target is content stored in the storage unit 305, the display control unit 308 reads the link target web page, develops the web page to the first storage area as bitmap data, and displays the bitmap data on the first display unit 106 (S516).

Next, the display control unit 308 judges whether there is a notification of the closed state in which the flip 103 is closed from the opened/closed detection unit 307 (S518), and processing moves to S602 if the judgment is in the affirmative. If the flip 103 is in the opened state, the display control unit 308 determines whether there is an instruction from the operation unit 306 via the control unit 304 to end operations (S520), and processing is ended if an end instruction is received. If there is no end instruction, processing returns to S512.

In S602, the display control unit 308, which has been notified of the closed state, erases the display of the first display unit. The display control unit 308 reads from the storage unit 305 the same web page that has been developed to the first storage area as bitmap data (S604), and converts the size of characters, if included in the web page, to the minimumsize (S606). The display control unit 308 determines whether an image included in the web page is larger than the size of the second storage area (S608), and, if the determination is affirmative, reduces the image so as to be smaller than the second storage area (S610).

The display control unit 308 converts the web page read from the storage unit 305 to the second storage area, develops the web page as bitmap data, and displays the bitmap data on the second display unit 201 (S612).

In this way, given that it is not necessary to reacquire content from an external server when displaying the same web page content from the first display unit 106 on the second display unit 201, the needless consumption of communication fees and time is eliminated.

The display control unit 308 determines whether there is an instruction via the control unit 304 to end operations of the operation unit 306 (S614), and ends processing if the determination is affirmative. If there is no end instruction, the display control unit 308 determines whether a notification of the closed state, in which the flip 103 is folded, has been received (S616).

If a notification of the opened state has been received, the display control unit 308 erases the display of the second display unit 201 (S618), reads the same web page from the storage unit 305 as is developed to the second storage area as bitmap data, develops the read web page to the first storage area as bitmap data, and displays the bitmap data on the first display unit 106 (S620), whereafter processing returns to S512.

The display control unit 308 waits for a user key operation from the operation unit 306 via the control unit 304 (S622). When a notification of a selection is received, the display control unit 308 determines whether the link target of the selected item is content other than that which is stored in the storage unit 305 (S624). If the link target is content stored in the storage unit 305, the display control unit 308 reads the link target web page from the storage unit 305 (S626), and processing returns to S606.

If the link target is not content stored in the storage unit 305, the control unit 304 reads content from an external server and causes the content to be stored in the storage unit 305 (S628), and processing returns to S626.

Although the display control unit 308 waits for specification of a URL in the above-mentioned embodiment, a "MAIN MENU" may be displayed on the first display unit 106 or the second display unit 201, whereby, for example, an EzMenu is displayed by selecting an item "Ezweb", and a screen for a portal site specified by a URL is displayed by further selecting an item "TOP MENU".

Note that although FIG. 3 shows a block diagram of the present invention in the above embodiment, the present invention may of course be computer programs for causing computers to realize functions of the constituent elements, and a computer included in a mobile phone may be caused to execute the programs.

Also, although content stored in the storage unit 305 is described as being acquired from an external server in the above embodiment, the storage unit 305 may store the content of received emails. Received image data in these emails may be displayed at their original size on the first display unit 106, and may be displayed at a reduced size on the second display unit 201 when the flip is folded.

Also, although a mobile phone is described in the above embodiment, the present invention is of course not limited to this, and may be any mobile communication device that has display screens of different sizes.

INDUSTRIAL APPLICABILITY

A mobile communication device pertaining to the present invention can be used in the information-communication field.

In view of the principles and features set forth herein, web page content, which is the same as web page content displayed on a first display unit with a mobile communication device in an opened state, is displayed on a smaller-sized second display unit with the mobile communication device in a closed state, without reacquiring content by another communication. A control unit (304) causes content acquired from an external website to be stored in a storage unit (305). When notified of the opened state by the opened/closed detection unit (308), a display control unit (308) reads a desired web page from the storage unit (305) to a first storage area corresponding to a size of the first display unit (106), develops the web page as bitmap data, and displays the bitmap data on the first display unit (106). When notified of the closed state by the opened/closed detection unit (307), the display control unit (308) erases the display of the first display unit (106), reads from the storage unit (305) the same web page developed to the first storage area as bitmap data, minimizes a size of characters, develops the web page as bitmap data to a second storage area corresponding to a size of the second display unit (201), and displays the bitmap data on the second display unit (201).

The invention claimed is:

1. An openable/closable mobile communication device having a first display screen and a second display screen that differ in screen size, comprising:
   a storage unit operable to store data; and
   a display control unit operable to read the data stored in the storage unit and display the data on the first display screen with a device main body in an opened state, read the same data and display the data on the second display screen with the device main body in a closed state, and determine whether a size of an image being displayed on the first display screen is larger than a size of the second display screen, wherein
   when the size of the image being displayed on the first display screen is less than or equal to the size of the second display screen, the display control unit does not perform size-reduction processing on the image when displaying the image on the second display screen.

2. The mobile communication device of claim 1, wherein a screen size of the second display screen is smaller than a screen size of the first display screen.

3. The mobile communication device of claim 2, further comprising:
a detection unit operable to detect whether the device main body is in the opened state or the closed state, wherein the display control unit includes a first storage subunit that corresponds to the screen size of the first display screen, and a second storage subunit that corresponds to the screen size of the second display screen,
when a notification of the opened state is received from the detection unit, the display control unit reads, from the storage unit, a desired web page which is the data, develops the web page to the first storage subunit as bitmap data, and displays the bitmap data on the first display screen, and
when a notification of the closed state is received from the detection unit, the display control unit reads the desired web page from the storage unit, develops the web page to the second storage subunit as bitmap data, and displays the bitmap data on the second display screen.

4. The mobile communication device of claim 3, wherein the display control unit sets a size of a character that is to be developed to the first storage subunit as bitmap data to a size specified by display information of the data stored in the storage unit, and changes a size of a character that is to be developed to the second storage subunit as bitmap data to a minimum size specified by the display information.

5. The mobile communication device of claim 4, wherein the size specified by the display information is one of 36×36 dot, 26×26 dot, 18×18 dot, and 12×12 dot, and the minimum size is 12×12 dot.

6. The mobile communication device of claim 3, wherein when a size of an image to be developed to the second storage subunit as bitmap data is larger than a size of the second storage subunit, the display control unit reduces the image to a size that can be held in the second storage subunit.

7. The mobile communication device of claim 1, wherein the data stored in the storage unit is web page content of a website, the content being acquired via a public network.

8. The mobile communication device of claim 7, wherein a five-point contact key for specifying a link in data displayed on the second display screen is provided on a same surface as the second display screen.

9. The openable/closable mobile communication device of claim 1, wherein
the image has been generated based on the data stored in the storage unit and constitutes a portion of a display on the first display screen or on the second display screen.

10. A screen switching method for an openable/closable mobile communication device having a first display screen and a second display screen that differ in screen size, comprising:
a recording step of recording data; and
a display control step of reading the data recorded in the recording step and displaying the data on the first display screen with a device main body in an opened state, reading the same data and displaying the data on the second display screen with the device main body in a closed state, and determining whether a size of an image being displayed on the first display screen is larger than a size of the second display screen, wherein
in the display control step, when the size of the image being displayed on the first display screen is less than or equal to the size of the second display screen, size-reduction processing is not performed on the image when displaying the image on the second display screen.

11. An openable/closable mobile communication device having a first display screen and a second display screen that differ in screen size, comprising:
a storage unit operable to store data; and
a display control unit operable to read the data stored in the storage unit and display the data on the first display screen with a device main body in a opened state, read the same data and display the data on the second display screen with the device main body in a closed state, and determining whether a size of an image being displayed on the first display screen is larger than a size of the second display screen, wherein,
when the size of the image being displayed on the first display screen is less than or equal to the size of the second display screen, the display control unit displays the image on the second display screen at an original size of the image, and
when the size of the image being displayed on the first display screen is greater than the size of the second display screen, the display control unit reduces the size of the image so as an entirety of the image can be displayed on the second display screen, and displays the reduced-size image on the second display screen.

* * * * *